Patented Apr. 23, 1940

2,198,300

UNITED STATES PATENT OFFICE 2,198,300

HYDROXYLATED 2-ARYL-PSEUDONAPHTHAZIMIDES

Gérald Bonhôte, Basel, and Carl Apotheker, Riehen, Switzerland, assignors to the firm Society of Chemical Industry in Basle, Basel, Switzerland No Drawing. Application June 28, 1938, Serial No. 216,350. In Switzerland June 30, 1937

4 Claims. (Cl. 260—308)

It has been found that valuable intermediate products for the production of azo-dyestuffs can be obtained, by fusing with caustic alkalies the pseudo-azimide sulfonic acid of the general formula

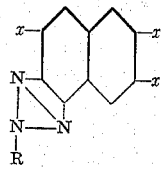

wherein R stands for an aromatic nucleus selected from the group consisting of aromatic nuclei of the benzene and naphthalene series, two x's stand for hydrogen atoms and one x stands for a sulfonic group. The new products which correspond to the general formula

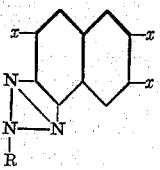

wherein R has the signification indicated above, two x's stand for hydrogen atoms and one x stands for a hydroxyl group, are crystallized compounds having a definite fusion point. They may be crystallized from organic solvents, are soluble in aqueous solutions of caustic alkalies, from which solutions they have an excellent affinity for cotton and vegetable fibers, respectively. The new azimides are therefore valuable commercial products which permit the production of insoluble azo-dyestuffs on the fiber, whereby the fiber is dyed valuable fast tints.

The possibility of producing such products is quite surprising, because it was to be supposed that at the very high temperature which must be used in order to convert the mono-sulfonic acid into the hydroxyl compound there would be deeply seated decomposition of the molecule. The same or isomeric azimides are obtained by the action of a diazo-compound on β-amino-β-hydroxynaphthalene in acid medium and treating the ortho-aminoazo-dyestuff thus produced with an oxidizing agent.

The following examples illustrate the invention, the parts being by weight:

Example 1

175 parts of 6-sulfo-2'-phenyl-1:2-pseudonaphthazimide (obtainable by oxidizing with sodium hypochlorite the azo-dyestuff from diazobenzene and 2-aminonaphthalene-6-sulfonic acid) are introduced into a mixture consisting of 375 parts of potassium hydroxide, 150 parts of sodium hydroxide and 40 parts of water. This mixture is heated gradually to 260–270° C. in a stirring autoclave. It is left at this temperature for about 1 hour. The mass is then dissolved in 2000 parts of hot water, filtered from undissolved matter, acidified with hydrochloric acid and the nearly colorless precipitate formed is filtered; for purification it is recrystallized from its glacial acetic acid. This compound is the 2-hydroxy-2'-phenyl-5:6-pseudonaphthazimide of the formula

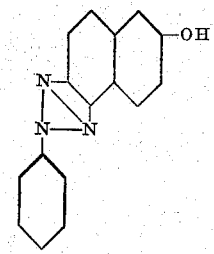

of melting point 223–224° C.

A similar procedure may be adopted with the oxidation products of the azo-dyestuffs from diazo-toluene, diazo-anisol, para-chlorodiazobenzene or the like and 2-aminonaphthalene-6- or -7-sulfonic acid. The 2-hydroxy-2'-(4''-methyl)-phenyl-5:6-pseudonaphthazimide melts at 195–196° C.; the 2-hydroxy-2'-(4''-chloro)-phenyl-5:6-pseudonaphthazimide melts at 210–211° C.; the 2-hydroxy-2'-phenyl-7:8-pseudonaphthazimide melts at 228–229° C.; the 2-hydroxy-2'-(4''-methoxy) phenyl-7:8-pseudonaphthazimide melts at 214–215° C.; the 2-hydroxy-2'-(4''-chloro)-phenyl-7:8-pseudonaphthazimide of the formula

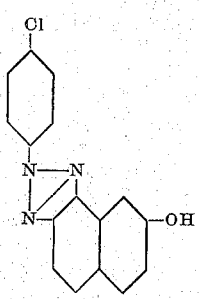

melts at 257–258° C.

Such azimides may also be made as follows:

A solution of 72 parts of sodium nitrite in 150 parts of water are added by drops to a suspension of 127.5 parts of 4-chloraniline in 300 parts of hydrochloric acid of 30 per cent strength, 260 parts of water and 640 parts of ice. After stirring for ½ hour at 5–7° C. the excess of nitrous acid is removed by addition of urea and the solution is then filtered from impurities and added by drops to a suspension of 159 parts of 2-hydroxy-6-aminonaphthalene in 110 parts of hydrochloric acid of 30 per cent strength and 500 parts of water. After a short time coupling sets in. To finish it the whole is stirred for 3 days at 0–5° C. and the brown-red pigment filtered.

By crystallization from 500 parts of sodium hydroxide of 30 per cent strength and 6000 parts of water the sodium salt of the dyestuff is obtained in the form of brown laminae of metallic lustre which is suspended in water and acidified with acetic acid. In this manner the dyestuff is obtained in the form of a red pigment.

To a solution of 297.5 parts of 2-hydroxy-5-(4'-chloro)-phenylazo-6-aminonaphthalene in 5000 parts of water there is added by drops at 20–25° C. a solution of 300 parts of crystallized copper sulfate in 1500 parts of water and 350 parts of ammonia of 25 per cent strength. This mixture is then made alkaline with caustic soda lye of 30 per cent strength, heated by introduction of steam to 70–75° C. and then filtered. By acidifying the filtrate with hydrochloric acid of 30 per cent strength there is obtained the oxidation product in the form of a nearly colorless precipitate. By crystallization from glacial acetic acid colorless prisms melting at 210–211° C. are obtained. When using as diazotizing component α-naphthylamine instead of 4-chloraniline, there is obtained a pseudonaphthazimide of the formula

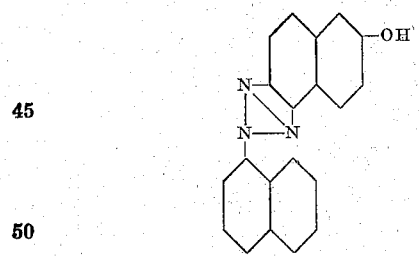

Example 2

Into a solution of 279 parts of aniline, 900 parts of hydrochloric acid of 30 per cent strength, 780 parts of water and 1920 parts of ice there is added by drops a solution of 216 parts of sodium nitrite in 450 parts of water, stirring is continued for 20 minutes at 0–2° C., the excess of nitrous acid is removed by adding urea and the solution is added to a suspension of 669 parts of 1-aminonaphthalene-3-sulfonic acid in 4500 parts of water. Within 3 hours there are added 1500 parts of crystallized sodium acetate and the whole is stirred for 82 hours at 0–5° C. The coupling begins with diminution of the mineral acid. The dyestuff separates in the form of a Bordeaux red pigment. For purification it is dissolved in dilute sodium hydroxide solution, the solution is filtered from impurities and the dyestuff precipitated from the filtrate by means of acetic acid.

To a solution of 654 parts of 1-amino-2-phenyl-azonaphthalene-3-sulfonic acid in 5000 parts of water and 300 parts of sodium hydroxide solution of 30 per cent strength there are added by drops at 50–55° C. 1200 parts of sodium hypochlorite solution. (12 per cent of active chlorine). The 2'-phenyl-3:4-naphthazimide-2-sulfonic acid is precipitated in the form of a feebly yellow-brown sodium salt. The mixture is heated to 80–85° C. and the oxidation product is filtered.

A mixture of 125 parts of the sodium salt of 2'-phenyl-3:4-naphthazimide-2-sulfonic acid with 375 parts of potassium hydroxide, 150 parts of sodium hydroxide, and 40 parts of water, is heated in an autoclave as follows:—

|  | Degrees centigrade |
|---|---|
| 1 hour at | 20–150 |
| Do | 150 |
| Do | 150–170 |
| Do | 170 |
| Do | 170–190 |
| 4 hours at | 195–205 |

The mass is dissolved in water and a sparingly soluble sodium salt of 2-hydroxy-2'-phenyl-3:4-naphthazimide of the formula

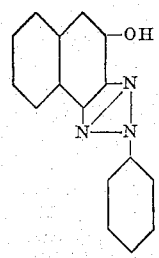

is filtered. By reaction with hydrochloric acid there is obtained the free naphthol in the form of a colorless body. It crystallizes from monochlorobenzene in colorless prisms melting at 197–198° C.

When replacing in this example the diazo-benzene by other diazo-compounds, for example the diazo-compounds leading to the azimides of Example 1, there are also obtained azimides in which the 2'-phenyl nucleus is replaced by a para-chloro-phenyl, a para-methoxy, a meta-chlorophenyl or an α-naphthyl-nucleus.

What we claim is:

1. The pseudonaphthazimide of the formula

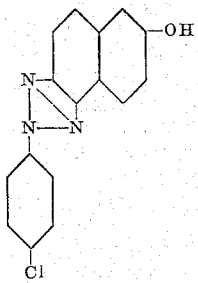

2. The pseudonaphthazimide of the formula

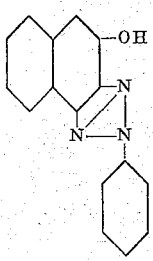

3. The pseudonaphthazimides of the formula

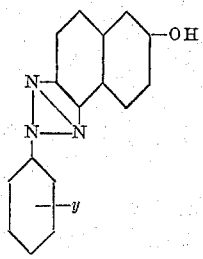

wherein $y$ stands for a member of the group consisting of hydrogen, halogen, alkyl and alkoxy.

4. The pseudonaphthazimides of the formula

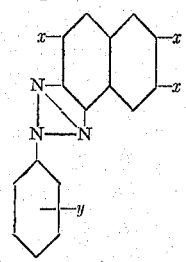

wherein the two $x$'s stand for hydrogen atoms and one $x$ stands for a hydroxyl group, and $y$ stands for a member of the group consisting of hydrogen, halogen, alkyl and alkoxy.

GÉRALD BONHÔTE.
CARL APOTHEKER.